(12) United States Patent
Matsumoto et al.

(10) Patent No.: US 10,566,913 B2
(45) Date of Patent: Feb. 18, 2020

(54) POWER GENERATION DEVICE AND PORTABLE ELECTRIC DEVICE

(71) Applicants: CITIZEN HOLDINGS CO., LTD., Tokyo (JP); CITIZEN WATCH CO., LTD., Tokyo (JP)

(72) Inventors: Kensaku Matsumoto, Ota-ku (JP); Takashi Ihara, Nishitokyo (JP); Makoto Watanabe, Tokorozawa (JP); Akira Izumi, Nerima-ku (JP)

(73) Assignee: Citizen Watch Co., LTD., Tokyo (JP)

( * ) Notice: Subject to any disclaimer, the term of this patent is extended or adjusted under 35 U.S.C. 154(b) by 679 days.

(21) Appl. No.: 15/129,422

(22) PCT Filed: Mar. 19, 2015

(86) PCT No.: PCT/JP2015/058349
§ 371 (c)(1),
(2) Date: Sep. 27, 2016

(87) PCT Pub. No.: WO2015/146806
PCT Pub. Date: Oct. 1, 2015

(65) Prior Publication Data
US 2017/0133952 A1    May 11, 2017

(30) Foreign Application Priority Data
Mar. 28, 2014 (JP) .................. 2014-070271

(51) Int. Cl.
*H02N 1/08* (2006.01)
*F03G 7/08* (2006.01)
*G04C 10/00* (2006.01)

(52) U.S. Cl.
CPC .................. *H02N 1/08* (2013.01); *F03G 7/08* (2013.01); *G04C 10/00* (2013.01)

(58) Field of Classification Search
CPC ... H02N 1/06; H02N 1/08; F03G 7/08; G04C 10/00; H02K 7/02; H02K 7/061; H02K 7/063
See application file for complete search history.

(56) References Cited

U.S. PATENT DOCUMENTS 4,966,254 A * 10/1990 Nakano .................. F03B 13/20
                                                                185/30
2006/0087494 A1    4/2006 Yatsu
(Continued)

FOREIGN PATENT DOCUMENTS

| CN | 102684545 A | 9/2012 |
|---|---|---|
| CN | 203430718 U | 2/2014 |

(Continued)

OTHER PUBLICATIONS

Machine Translation of Imasen Electrci Ind [JP 2011-196368 (Year: 2011).*

(Continued)

*Primary Examiner* — Bernard Rojas
(74) *Attorney, Agent, or Firm* — HEA Law PLLC

(57) ABSTRACT

Provided is an electric power generating device capable of performing electret power generation by efficiently rotating a rotating electrode group. The electric power generating device includes: a plurality of electret electrodes each made of an electret material and formed into a planar shape, and arranged in a circular shape at intervals in a first plane; a plurality of counter electrodes arranged in a circular shape in a second plane facing the first plane so as to face the plurality of electret electrodes; an oscillating weight supported in a rotatable manner; and a motive power transmission mechanism configured to transmit motive power generated by rotations of the oscillating weight to a rotating electrode group including any one of the plurality of electret electrodes and the plurality of counter electrodes, to thereby (Continued)

rotate the rotating electrode group so that the rotating electrode group is moved relative to another electrode group, the motive power transmission mechanism including a clutch mechanism configured to transmit only a rotation of the oscillating weight in one predetermined direction.

9 Claims, 14 Drawing Sheets

(56) References Cited

U.S. PATENT DOCUMENTS

| | | | |
|---|---|---|---|
| 2006/0187761 A1* | 8/2006 | Ito | G04B 3/046 368/139 |
| 2012/0228964 A1 | 9/2012 | Uesugi | |

FOREIGN PATENT DOCUMENTS

| | | |
|---|---|---|
| JP | H02-259285 A | 10/1990 |
| JP | H06-189501 A | 7/1994 |
| JP | 2006-119893 A | 5/2006 |
| JP | 2006-258795 A | 9/2006 |
| JP | 2011-072070 A | 4/2011 |
| JP | 2011-078214 A | 4/2011 |
| JP | 2011-097718 A | 5/2011 |
| JP | 2011-196368 A | 10/2011 |
| JP | 2013-059149 A | 3/2013 |
| JP | 2013-135544 A | 7/2013 |
| JP | 2014-011921 A | 1/2014 |
| WO | 2015/014288 A1 | 2/2015 |

OTHER PUBLICATIONS

Machine Translation of Casio Computer Co Ltd [JP 2011-072070] (Year: 2011).*
Machine Translation of Citizens Holdins Co. [JP 2013-135544] (Year: 2013).*
Machine Translation of Nosaka [JPH06-189501] (Year: 1994).*
Machine Translation of Rohm Co., Ltd. [JP2014011921] (Year: 2014).*
Office Action dated Dec. 28, 2017, for corresponding CN Patent Application No. 201580017234.X.
English translation of the International Search Report for PCT/JP2015/058349 dated Mar. 19, 2015.
Search Report and the European Search Opinion dated Nov. 20, 2017, for corresponding EP Patent Application No. 15770003.0.

* cited by examiner

POWER GENERATION DEVICE AND PORTABLE ELECTRIC DEVICE

CROSS REFERENCE TO RELATED APPLICATIONS

This application is a National Stage of International Application No. PCT/JP2015/058349 filed on Mar. 19, 2015, which claims priority from JP 2014 070271. The contents of the above documents are incorporated herein by reference in their entirety.

TECHNICAL FIELD

The present invention relates to an electric power generating device configured to generate electric power by rotating electrodes in conjunction with movement of an oscillating weight, and a portable electric apparatus that uses the electric power generating device.

BACKGROUND ART

There have been known electric power generating devices that use an electret material having properties of semipermanently holding electric charges. Those electric power generating devices include electret electrodes made of an electret material, and counter electrodes configured to face the electret electrodes. Through use of electrostatic induction caused by variation in overlapping area between the electret electrodes and the counter electrodes, electric power is generated. Such electric power generating devices have advantages of being relatively smaller in size and capable of converting oscillation of the electrodes, which is caused in conjunction with movement of the device itself, to electrical energy. Thus, there has been investigated the possibility of application to portable electric apparatus configured to be worn or carried by users, such as a wristwatch.

Normally, in the electric power generating devices, in order to enhance efficiency in generation of electric power, a plurality of electret electrodes are arranged at intervals. A plurality of counter electrodes are also arranged so as to face the plurality of electret electrodes. With this configuration, through movement of the electret electrodes relative to the counter electrodes, electric power can be simultaneously extracted from the plurality of counter electrodes. In Patent Literatures 1 to 4, both the electret electrodes and the counter electrodes are arranged in a circular shape. Through rotation of one of the electret electrodes and the counter electrodes, charging and discharging of the plurality of counter electrodes are simultaneously performed.

CITATION LIST

Patent Literature

[Patent Literature 1] JP 2011-097718 A
[Patent Literature 2] JP 2011-078214 A
[Patent Literature 3] JP 2013-059149 A
[Patent Literature 4] JP 2011-072070 A

SUMMARY OF INVENTION

Technical Problem

In the electric power generating devices described above, when any one of the plurality of counter electrodes and the plurality of electret electrodes (hereinafter referred to as "rotating electrode group") is rotated, an oscillating weight is coupled to a rotary shaft of the rotating electrode group. With this, in conjunction with the movement of the electric power generating device itself, the oscillating weight is rotated by inertia. In conjunction with this rotation, the rotating electrode group is rotated. In this case, normally, there is a difference between a speed of the rotation of the rotating electrode group, which is suited to electric power generation, and a speed of the rotation of the oscillating weight, which is caused in conjunction with the movement of the electric power generating device. For example, when the electric power generating device is built in a wristwatch, the oscillating weight is rotated in conjunction with movement of the arm of a person while walking, for example. In this case, the rotation speed of the oscillating weight is approximately a fraction of a desired rotation speed of the electric power generating device. In order to eliminate such a difference in rotation speed, it is conceivable to arrange a speed-increasing mechanism between the oscillating weight and the rotating electrode group as in Patent Literature 4. However, there is a problem in that the arrangement of the speed-increasing mechanism adversely hinders the rotation of the oscillating weight due to the load of the speed-increasing mechanism. Further, when the rotation of the oscillating weight is decelerated or reversed, there is another problem in that inertial energy of the rotating electrode group is lost.

The present invention has been made to solve the problems described above. It is an object of the present invention to provide an electric power generating device capable of performing electret power generation by efficiently rotating a rotating electrode group, and to provide a portable electric apparatus that uses the electric power generating device.

Solution to Problem

The invention disclosed in this application to solve the above-mentioned problems has various aspects, and the representative aspects are outlined as follows.

(1) There is provided an electric power generating device, including: a plurality of electret electrodes each made of an electret material and formed into a planar shape, and arranged in a circular shape at intervals in a first plane; a plurality of counter electrodes arranged in a circular shape in a second plane facing the first plane so as to face the plurality of electret electrodes; an oscillating weight supported in a rotatable manner; and a motive power transmission mechanism configured to transmit motive power generated by rotations of the oscillating weight to a rotating electrode group including any one of the plurality of electret electrodes and the plurality of counter electrodes, to thereby rotate the rotating electrode group so that the rotating electrode group is moved relative to another electrode group, the motive power transmission mechanism including a clutch mechanism configured to transmit only a rotation of the oscillating weight in one predetermined direction.

(2) In the electric power generating device according to Item (1), the motive power transmission mechanism further includes a speed-increasing mechanism configured to transmit the rotation of the oscillating weight at an increased speed.

(3) In the electric power generating device according to Item (1) or (2), the rotating electrode group is fixed to a single substrate, the motive power transmission mechanism is configured to rotate the single substrate so that the rotating electrode group is rotated, and the electric power generating device further includes a substrate weight mounted on an outer peripheral side of the single substrate.

(4) In the electric power generating device according to anyone of Items (1) to (3), the motive power transmission mechanism further includes a second clutch mechanism configured to transmit, to the rotating electrode group, only a rotation of the oscillating weight in a direction reverse to the one predetermined direction.

(5) In the electric power generating device according to any one of Items (1) to (4), the oscillating weight is configured to vary in distance from a rotation center of the oscillating weight to a center of gravity of the oscillating weight in accordance with variation in rotation speed of the oscillating weight.

(6) In the electric power generating device according to any one of Items (1) to (5), the plurality of electret electrodes are formed on a surface of the clutch mechanism on a side of facing the plurality of counter electrodes.

(7) There is provided a portable electric apparatus, including: the electric power generating device of any one of Items (1) to (6); and a load configured to be operated by consuming electric power generated by the electric power generating device, the oscillating weight being configured to be rotationally moved in conjunction with movement of the portable electric apparatus itself.

(8) The portable electric apparatus according to Item (7) further includes: an operating member configured to receive a manual operation by a user; and an operative motive power transmission mechanism configured to transmit, to the rotating electrode group, motive power generated by the manual operation received via the operating member.

(9) The portable electric apparatus according to Item (7) or (8) further includes a step-down circuit configured to be driven by the electric power generated by the electric power generating device, and to step down a voltage caused by the generated electric power to output the voltage.

Advantageous Effects of Invention

According to the aspect of Item (1), only the rotation of the oscillating weight in the one direction is transmitted to the rotating electrode group. With this configuration, the rotating electrode group can be efficiently rotated.

According to the aspect of Item (2), the rotating electrode group can be rotated at higher speed.

According to the aspect of Item (3), a rotation of the rotating electrode group can be easily maintained by inertia.

According to the aspect of Item (4), the rotations of the oscillating weight in both the directions can be efficiently transmitted to the rotating electrode group. With this configuration, the rotating electrode group can be rotated at high speed.

According to the aspect of Item (5), even after the portable electric apparatus having the electric power generating device built therein is not operated, the rotation of the oscillating weight can be easily maintained.

According to the aspect of Item (6), a thickness of the electric power generating device in a direction of a rotary shaft of the electric power generating device can be reduced. With this configuration, the electric power generating device can be downsized.

According to the aspect of Item (7), through utilization of the electric power generating device according to the aspects of the present invention, the portable electric apparatus is allowed to efficiently generate electric power therein.

According to the aspect of Item (8), electric power can be generated manually with the electric power generating device.

DESCRIPTION OF EMBODIMENTS

Now, with reference to the drawings, detailed description is given of embodiments of the present invention.

First Embodiment

Figure 1:
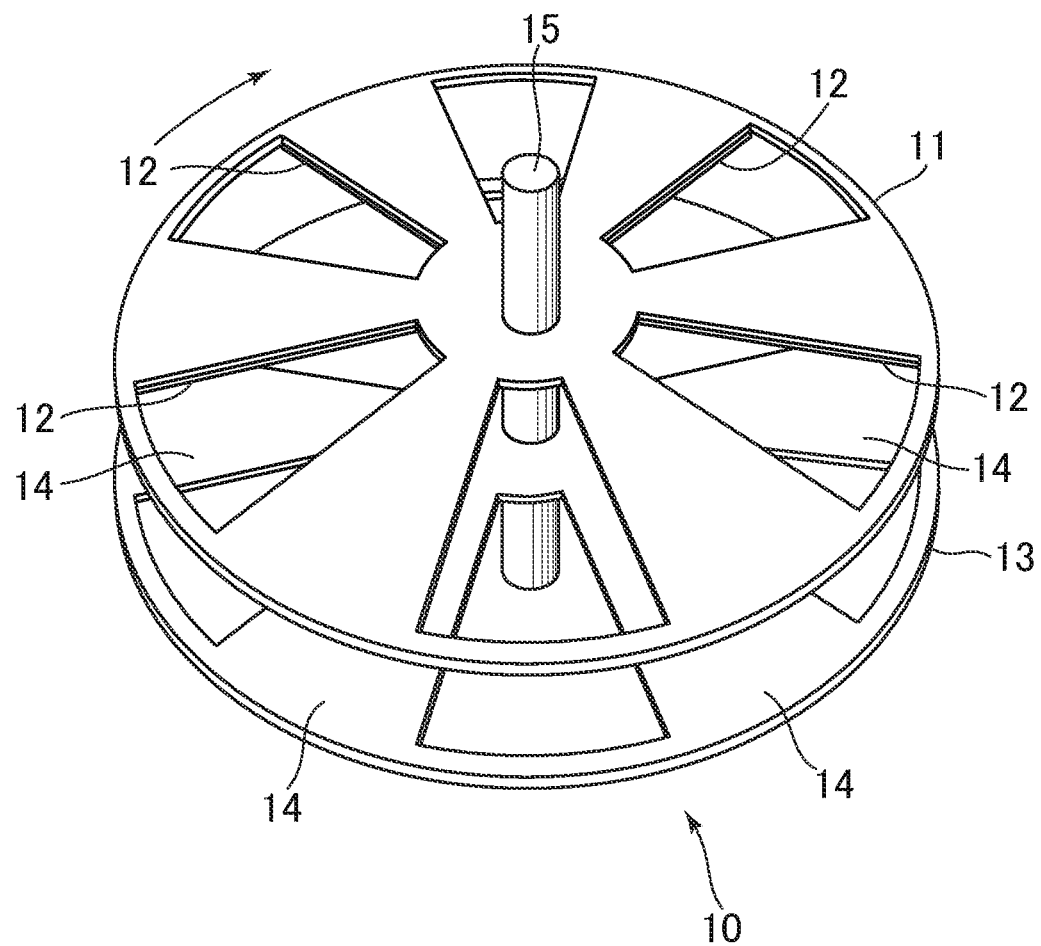
FIG. 1 is a perspective view for illustrating a schematic configuration of an electric power generating device according to a first embodiment of the present invention.
Figure 2:
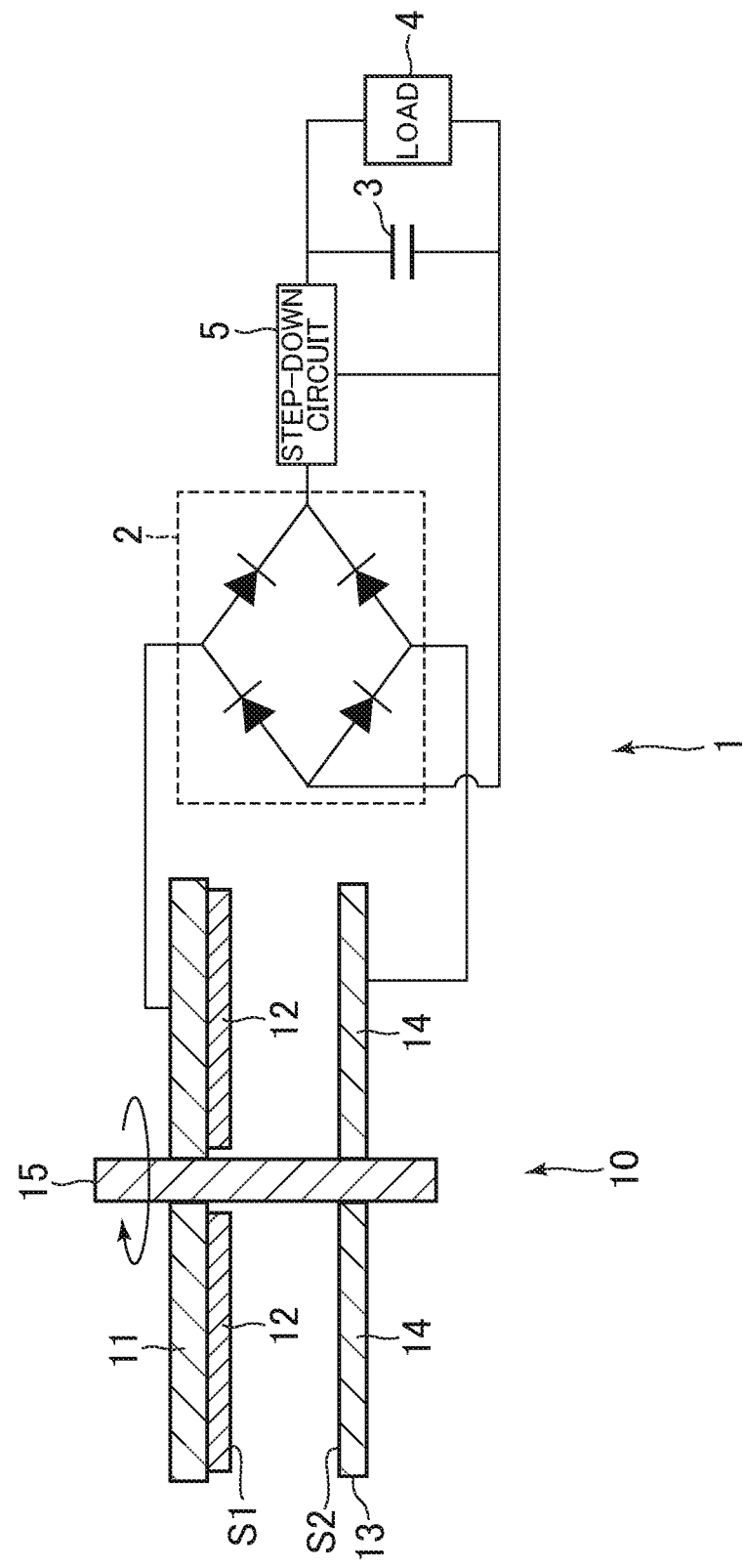
FIG. 2 is a configuration diagram for illustrating a schematic configuration of a portable electric apparatus including the electric power generating device according to the first embodiment of the present invention.

FIG. 1 is a perspective view for illustrating a schematic configuration of an electric power generating device 10 according to a first embodiment of the present invention. Further, FIG. 2 is a configuration diagram for illustrating a schematic configuration of a portable electric apparatus 1 having the electric power generating device 10 built therein. As illustrated in FIG. 1, the electric power generating device 10 includes a first substrate 11, a plurality of electret electrodes 12, a second substrate 13, a plurality of counter electrodes 14, and a rotary shaft 15. Further, although not shown in FIG. 1, the electric power generating device 10 also includes an oscillating weight 16 and a motive power transmission mechanism 17. In addition, as illustrated in FIG. 2, the portable electric apparatus 1 includes the electric power generating device 10, a rectifying circuit 2, a capacitor member 3, a load 4, and a step-down circuit 5.

The first substrate 11 is formed of an electrical conductor such as a metal, and has a substantially overall disc shape. The first substrate 11 has a plurality of through-holes radially formed around its center position. Those through-holes are each formed into a substantially trapezoidal shape, and each have two sides respectively on an outer peripheral side and a center side of the first substrate 11. Those two sides are each formed into an arc shape along the outer periphery of the first substrate 11. With the through-holes, between the center and the outer periphery of the first substrate 11, a plurality of substantially trapezoidal electrical conductors are formed so as to be arranged radially at intervals.

On surfaces of the substantially trapezoidal electrical conductors on the second substrate 13 side, which are formed of the first substrate 11, the electret electrodes 12 are each formed into a film form. Those electret electrodes 12 are each also formed into a substantially overall trapezoidal shape, and each have two sides respectively on the outer peripheral side and the center side of the first substrate 11. Those two sides are each formed into an arc shape along the outer periphery of the first substrate 11. The electret electrodes 12 are made of an electret material, and have a negative electric charge. The electret electrodes 12 herein are negatively charged, but the electret electrodes 12 may be made of a material to be positively charged. The electret material is a material that can be easily charged. Specifically, as examples of materials to be negatively charged, there are given silicon oxide ($SiO_2$) and fluororesin materials. More specifically, as an example of the materials to be negatively charged, there is given a fluoro resin material "CYTOP" (trademark) produced by ASAHI GLASS Co., Ltd. In addition, examples of other electret materials include polypropylene (PP), polyethylene terephthalate (PET), polyvinyl chloride (PVC), polystyrene (PS), polytetrafluoroethylene (PTFE), polyvinylidene difluoride (PVDF), and polyvinyl fluoride (PVF) as a polymeric material. As an inorganic material, the above-mentioned silicon oxide ($SiO_2$), silicon nitride (SiN), or the like can be also used. Further, an imaginary plane including surfaces of the electret electrodes 12 on the second substrate 13 side is herein referred to as a first plane S1. The plurality of electret electrodes 12 are arranged in a circular shape at intervals in this first plane S1.

The second substrate 13 is formed of an electrical conductor such as a metal similarly to the first substrate 11, and has a size and a shape corresponding to those of the first substrate 11. In other words, the second substrate 13 has substantially a disc shape, and has through-holes formed therein in substantially the same shape and as many as those of the first substrate 11. With those through-holes, between a center and the outer periphery of the second substrate 13, electrical conductors formed into substantially the same shape and as many as the electret electrodes 12 are arranged radially. The plurality of electrical conductors function as they are as the counter electrodes 14. The first substrate 11 and the second substrate 13 are arranged so as to be parallel to and to face each other. With this, the electret electrodes 12 on the first substrate 11 face the counter electrodes 14 of the second substrate 13. An imaginary plane including surfaces of the plurality of counter electrodes 14 on the first substrate 11 side is herein referred to as a second plane S2. The second plane S2 faces the first plane S1. The plurality of counter electrodes 14 are arranged in a circular shape at intervals in the second plane S2.

The rotary shaft 15 is arranged so as to be orthogonal to the first plane S1 and the second plane S2, and to pass through the center of the first substrate 11 and the center of the second substrate 13. Further, the first substrate 11 is supported to be rotatable about the rotary shaft 15. Meanwhile, the second substrate 13 is fixed to a casing of the portable electric apparatus 1.

With such a configuration, in conjunction with movement of the portable electric apparatus 1 itself, the first substrate 11 is rotated as indicated by the arrows in FIG. 1 and FIG. 2. Although not shown, in order to rotate the first substrate 11, the oscillating weight 16 is coupled to the rotary shaft 15 through intermediation of the motive power transmission mechanism 17. A configuration for rotating the first substrate 11 by using the oscillating weight 16 and the motive power transmission mechanism 17 is described in detail below. With the rotation of the first substrate 11, the electret electrodes 12 are moved relative to the counter electrodes 14 in the first plane S1 in a manner that overlapping areas therebetween are varied. When each electret electrode 12 is moved by this rotation to a position of facing any one of the counter electrodes 14 in front thereof, through electrostatic induction, the counter electrode 14 is charged with electric charges having a polarity reverse to that of the electret electrode 12 (in this case, positive polarity). Then, when the first substrate 11 is further rotated so that the electret electrode 12 is moved to a position of not facing the counter electrode 14, that is, the electret electrode 12 is moved to a position of facing the through-hole of the second substrate 13, the electric charges of the counter electrode 14 are discharged. In this way, along with the rotation of the first substrate 11, electrical charging and discharging of the counter electrodes 14 are repeated.

The charging and the discharging of the counter electrodes 14 cause electric current to flow from the electric power generating device 10 to the rectifying circuit 2 side. This electric current is rectified by the rectifying circuit 2. Then, a voltage is stepped down by the step-down circuit 5, and is input to the capacitor member 3. In this way, electric power generated by the electric power generating device 10 is stored in the capacitor member 3. The electric power stored in the capacitor member 3 is supplied as appropriate to the load 4. Examples of the capacitor member 3 may include a rechargeable secondary battery such as a lithium secondary battery, and a capacitor configured to store electric charges. The load 4 is a circuit configured to exert a function of the portable electric apparatus 1, and is operated by consuming the electric power supplied from the capacitor member 3. For example, when the portable electric apparatus 1 is a wristwatch, the load 4 includes a clock circuit configured to perform various controls such as counting of a current time.

Figure 3:
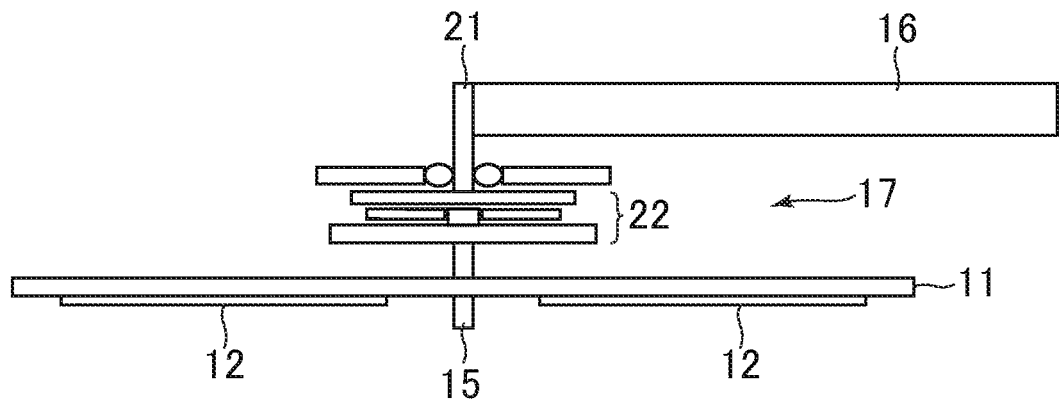
FIG. 3 is an explanatory view for illustrating a motive power transmission mechanism of the electric power generating device according to the first embodiment of the present invention.

Now, configurations of the oscillating weight 16 and the motive power transmission mechanism 17 are described with reference to FIG. 3. FIG. 3 is an explanatory view for illustrating the configuration of the motive power transmission mechanism 17, specifically, schematically illustrating a positional relationship between members as viewed from a lateral side of the electric power generating device 10. In FIG. 3, the second substrate 13 is not shown. Further, in the following, for the sake of simplicity of description, the plurality of electret electrodes 12 that are rotated by the oscillating weight 16 and the motive power transmission mechanism 17 are collectively referred to as a rotating electrode group.

The oscillating weight 16 is supported in a rotatable manner by a rotary shaft 21, and a position of a center of gravity of the oscillating weight 16 is spaced away from the rotary shaft 21 that serves as a rotation center. The oscillating weight 16 is rotated in conjunction with movement of the portable electric apparatus 1 itself. For example, in the case where the portable electric apparatus 1 is a wristwatch, when a user wearing the wristwatch moves his/her arm while walking, the oscillating weight 16 is rotated. Further, the oscillating weight 16 is rotatable in both a clockwise direction and a counterclockwise direction.

Motive power generated by rotation of the oscillating weight 16 is transmitted to the rotating electrode group via the motive power transmission mechanism 17. A feature of this embodiment resides in that the motive power transmission mechanism 17 includes a clutch mechanism 22. The rotary shaft 21, the rotary shaft 15, and the first substrate 11 described above also form a part of the motive power transmission mechanism 17.

The clutch mechanism 22 according to this embodiment is what is called a one-way clutch mechanism, and is configured to transmit, of the rotations of the oscillating weight 16, only a rotation in one predetermined direction to the rotating electrode group. In the following, the direction of the rotation of the oscillating weight 16, which is transmitted via the clutch mechanism 22, is referred to as a forward direction. Further, a direction of a rotation reverse to the forward direction is referred to as a reverse direction. The clutch mechanism 22 may employ various known systems. As illustrated in FIG. 3, the clutch mechanism 22 is configured to mesh and interlock with both the rotary shaft 21 and the rotary shaft 15. With this, when the oscillating weight 16 is rotated in the forward direction, motive power generated by this forward rotation is transmitted sequentially to the rotary shaft 21, the clutch mechanism 22, the rotary shaft 15, and the first substrate 11. In this way, the rotating electrode group fixed to the first substrate 11 is rotated in the one predetermined direction. In FIG. 3, a rotation direction of the rotating electrode group is the same as the forward direction of the oscillating weight 16. Meanwhile, when the oscillating weight 16 is rotated in the reverse direction, motive power generated by this reverse rotation is interrupted by the clutch mechanism 22. With this, the oscillating weight 16 is idled, and the reverse rotation is not transmitted to the rotating electrode group.

Figure 13:
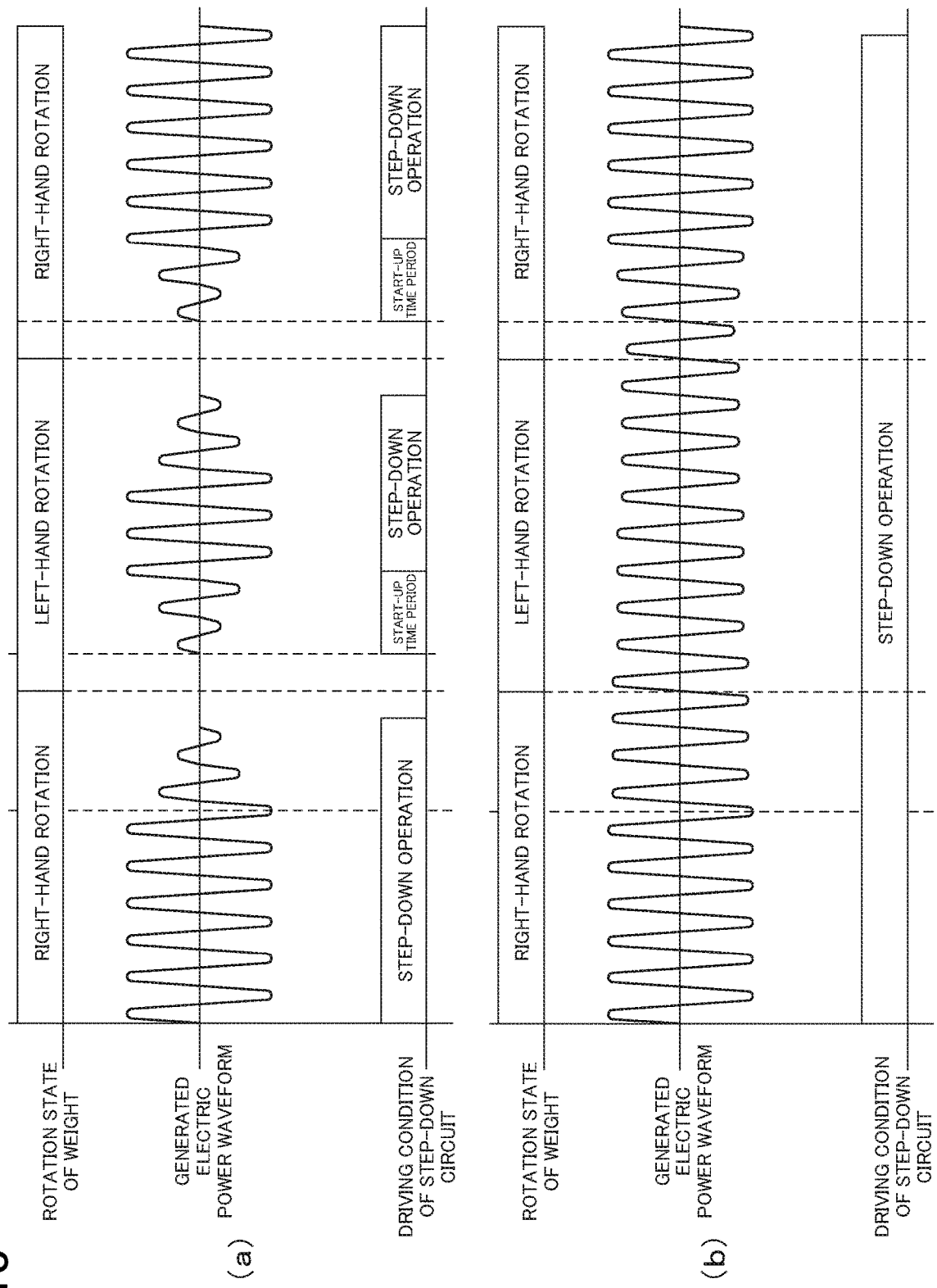
FIG. 13 are timing charts for illustrating generated electric power waveforms and driving conditions of a step-down circuit.

In this context, as a comparative example, an operation of a portable electric apparatus that uses a motive power transmission mechanism without the one-way clutch mechanism, that is, the clutch mechanism 22, is described. FIG. 13(*a*) is a timing chart for illustrating a generated electric power waveform and a driving condition of a step-down circuit of the comparative example. In a portable electric apparatus of the comparative example, in conjunction with movement of the portable electric apparatus itself, the oscillating weight 16 alternately repeats a right-hand rotation and a left-hand rotation. With this, both the right-hand rotation and the left-hand rotation are transmitted to the rotating electrode group. Specifically, when the oscillating weight 16 is rotated to the right, the rotating electrode group is rotated to the right. When the oscillating weight 16 is rotated to the left, the rotating electrode group is rotated to the left. In the configuration of rotating the oscillating weight 16 and the rotating electrode group in the same direction as described above, when the rotation direction of the oscillating weight 16 is switched, the rotation of the rotating electrode group is sharply decelerated.

When the rotation the rotating electrode group is sharply decelerated, electric power generation by the electric power generating device 10 is stopped for a certain time period. In this time period, the driving of the step-down circuit 5 stops. When the rotating electrode group once decelerated and stopped starts to be rotated in the reverse direction, the electric power generation is restarted. In conjunction therewith, the driving of the step-down circuit 5 also restarts. However, a start-up time period for restarting the driving of the step-down circuit 5 once stopped is needed. In this way, in the configuration of the comparative example, in addition to a time period in which the rotation of the rotating electrode group is decelerated and the electric power generation is stopped, the start-up time period of the step-down circuit 5 is needed. As a result, charging efficiency is deteriorated.

Meanwhile, in the first embodiment, as described above, the clutch mechanism 22 is configured to transmit only the forward rotation of the oscillating weight 16 to the rotating electrode group. With this, the rotating electrode group continues to be rotated only in the one direction. Specifically, of the forward rotation and the reverse rotation, which are alternately repeated by the oscillating weight 16 in conjunction with the movement of the portable electric apparatus 1 itself, the reverse rotation is not transmitted to the rotating electrode group. Thus, while the oscillating weight 16 is rotated in the reverse direction, the rotating electrode group continues to be rotated by inertia in the forward direction, and hence is not sharply decelerated. Thus, in the first embodiment, as illustrated in the timing chart of FIG. 13(*b*), even when the rotation direction of the oscillating weight 16 is switched, the rotating electrode group is not sharply decelerated. Thus, amplitude of the generated electric power waveform is not sharply reduced. With this, the driving of the step-down circuit 5, which is driven by the electric power generated by the electric power generating device 10, continues without being stopped. Further, when the oscillating weight 16 is rotated again in the forward direction, by the motive power of this forward rotation, the rotation of the rotating electrode group is accelerated. In this way, according to the electric power generating device 10 of this embodiment, through the interposition of the clutch mechanism 22, the rotation speed of the rotating electrode group can be increased. In addition, in comparison with a case where the rotation speed is increased only with a speed-increasing mechanism, a load on the oscillating weight 16 can be reduced. With this, the motive power generated by the rotation of the oscillating weight 16 can be efficiently transmitted to the rotating electrode group.

Second Embodiment

Next, a second embodiment of the present invention is described. An electric power generating device and a portable electric apparatus according to this embodiment are different in configuration of the motive power transmission mechanism 17 from those of the first embodiment. Other configurations are the same as those of the first embodiment illustrated in FIG. 1 and FIG. 2. Thus, in the following description, the same components as those of the first embodiment are denoted by the same reference symbols, and detailed description thereof is omitted.

Figure 4:
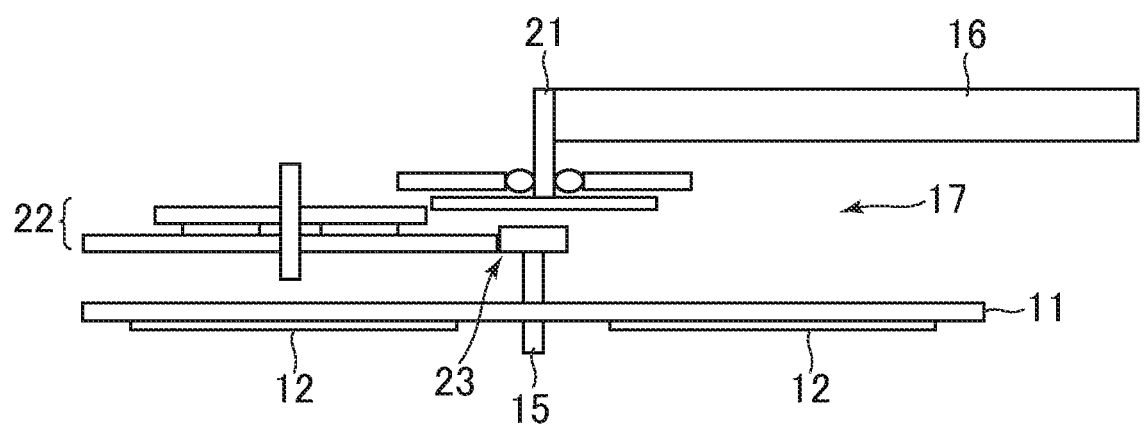
FIG. 4 is an explanatory view for illustrating a motive power transmission mechanism of an electric power generating device according to a second embodiment of the present invention.

FIG. 4 is an explanatory view for illustrating a configuration of the motive power transmission mechanism 17 according to this embodiment. As illustrated in FIG. 4, the motive power transmission mechanism 17 according to this embodiment includes not only the clutch mechanism 22 but also a speed-increasing mechanism 23.

The speed-increasing mechanism 23 is arranged between the clutch mechanism 22 and the rotary shaft 15, and is configured to transmit, at an increased speed, the rotation that is transmitted via the clutch mechanism 22, to the rotary shaft 15. Examples of the speed-increasing mechanism 23 may include a speed-increasing gear train formed of a plurality of gears having different gear ratios.

In this embodiment, the speed of the forward rotation of the oscillating weight 16 is increased by the speed-increasing mechanism 23 and then transmitted to the rotating electrode group. Thus, in comparison with the first embodiment, the rotation speed of the rotating electrode group can be further increased. Meanwhile, through the interposition of the clutch mechanism 22, in comparison with a case where the speed of the rotation of the oscillating weight 16 is increased only with the speed-increasing mechanism 23, a load on the oscillating weight 16, which is necessary for achieving a target rotation speed, can be reduced.

Third Embodiment

Next, a third embodiment of the present invention is described. An electric power generating device and a portable electric apparatus according to this embodiment are the same as those of the second embodiment except that a substrate weight 24 described below is mounted to the first substrate 11. Thus, description of the parts common to those of the second embodiment is omitted.

Figure 5:
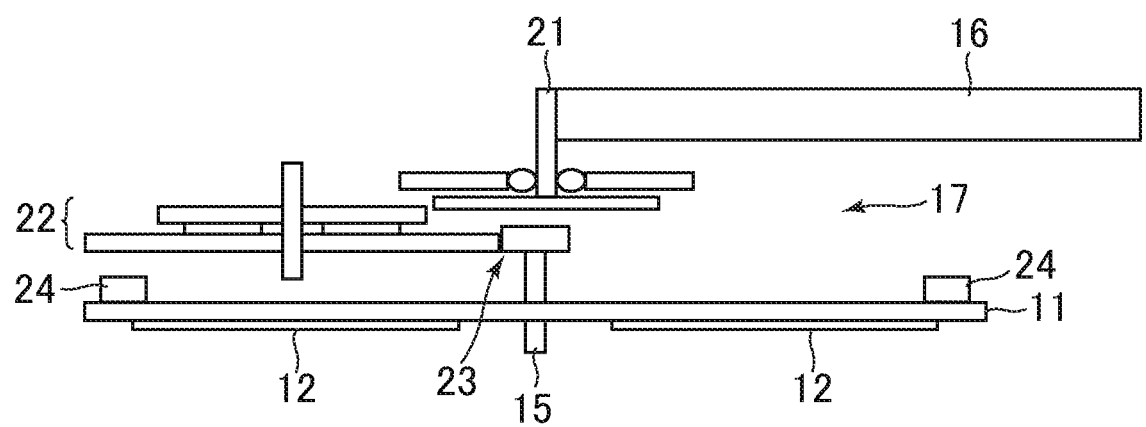
FIG. 5 is an explanatory view for illustrating a motive power transmission mechanism of an electric power generating device according to a third embodiment of the present invention.

FIG. 5 is an explanatory view for illustrating a configuration of the motive power transmission mechanism 17 according to this embodiment. As illustrated in FIG. 5, in this embodiment, as in the second embodiment, the motive power transmission mechanism 17 includes the clutch mechanism 22 and the speed-increasing mechanism 23. Further, the substrate weight 24 is mounted to the first substrate 11 having the rotating electrode group fixed thereto. This substrate weight 24 is fixed along an outer periphery of the first substrate 11. With this, inertia moment of the first substrate 11 is increased, and hence the rotation of the first substrate 11 is easily maintained. In particular, in this embodiment, in order to increase the rotation speed of the rotating electrode group, it is desired that, also while the oscillating weight 16 is rotated in the reverse direction, the rotating electrode group continue to be rotated. Through the arrangement of the substrate weight 24, also while the transmission of the motive power from the oscillating weight 16 to the rotating electrode group is stopped, the rotation of the rotating electrode group is easily maintained.

Fourth Embodiment

Next, a fourth embodiment of the present invention is described. As in the case of the second embodiment, a configuration of this embodiment is the same as that of the first embodiment except the configuration of the motive power transmission mechanism 17.

Figure 6:
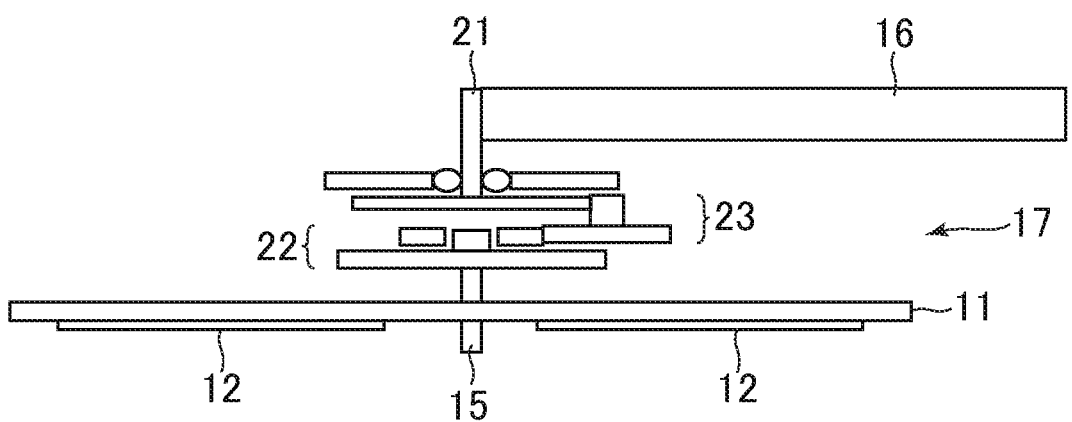
FIG. 6 is an explanatory view for illustrating a motive power transmission mechanism of an electric power generating device according to a fourth embodiment of the present invention.

FIG. 6 is an explanatory view for illustrating a configuration of the motive power transmission mechanism 17 according to this embodiment. As illustrated in FIG. 6, in this embodiment, as in the second embodiment, the motive power transmission mechanism 17 includes the clutch mechanism 22 and the speed-increasing mechanism 23. However, unlike the second embodiment, the speed-increasing mechanism 23 is arranged between the rotary shaft 21 and the clutch mechanism 22 instead of between the clutch mechanism 22 and the rotary shaft 15. With this, the speed-increasing mechanism 23 increases the speed of the rotation of the oscillating weight 16, which is transmitted via the rotary shaft 21, and transmits this rotation to the clutch mechanism 22.

According to this embodiment, as in the second embodiment, in comparison with the first embodiment, the rotation speed of the rotating electrode group can be increased. Further, in this embodiment, in comparison with the second embodiment, the rotation of the rotating electrode group can be more easily maintained. The reason for this is as follows. Specifically, in the second embodiment, while the transmission of the motive power from the oscillating weight 16 is interrupted by the clutch mechanism 22, both the speed-increasing mechanism 23 and the clutch mechanism 22 become a load against inertial rotation of the first substrate 11. In contrast, in this embodiment, with respect to the clutch mechanism 22, the speed-increasing mechanism 23 is arranged not on the rotating electrode group the side but on the oscillating weight 16 side. Thus, while the clutch mechanism 22 interrupts the transmission of the motive power, only components on a downstream side with respect to the clutch mechanism 22 become a load against the rotation of the first substrate 11. In this way, the speed-increasing mechanism 23 does not become a load. With this, in comparison with the second embodiment, the inertial rotation of the rotating electrode group while the clutch mechanism 22 interrupts the transmission of the motive power can be more easily maintained.

Fifth Embodiment

Next, a fifth embodiment of the present invention is described. As in the case of the second embodiment, a configuration of this embodiment is the same as that of the first embodiment except the configuration of the motive power transmission mechanism 17.

Figure 7:
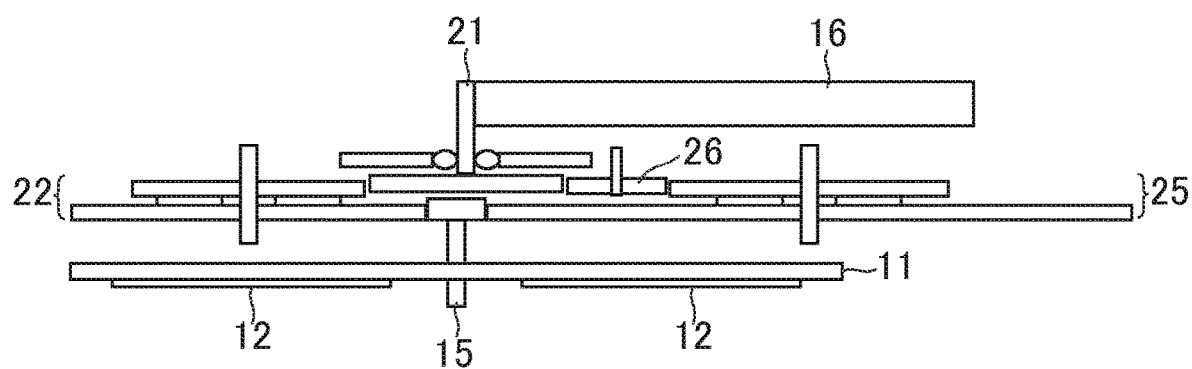
FIG. 7 is an explanatory view for illustrating a motive power transmission mechanism of an electric power generating device according to a fifth embodiment of the present invention.

FIG. 7 is an explanatory view for illustrating a configuration of the motive power transmission mechanism 17 according to this embodiment. As illustrated in FIG. 7, the motive power transmission mechanism 17 according to this embodiment includes not only the clutch mechanism 22 configured to transmit the forward rotation of the oscillating weight 16, but also a second clutch mechanism 25 and a gear 26.

The second clutch mechanism 25 is a one-way clutch mechanism similar to the clutch mechanism 22. Note that, between the rotary shaft 21 and the second clutch mechanism 25, the gear 26 is interposed. With this, into the second clutch mechanism 25, the motive power generated by the rotation of the oscillating weight 16 is input as a rotation reverse to the rotation transmitted via the clutch mechanism 22. Thus, the second clutch mechanism 25 transmits only the reverse rotation of the oscillating weight 16 to the rotating electrode group. In the motive power transmission mechanism 17 according to this embodiment, the clutch mechanism 22 and the second clutch mechanism 25 are combined with each other, to thereby exert a function of what is called a two-way clutch mechanism.

Specifically, when the oscillating weight 16 is rotated in the forward direction, as in the second embodiment, the motive power therefrom is transmitted via the clutch mechanism 22 to the rotating electrode group. With this, the rotating electrode group is rotated in one predetermined direction (in this embodiment, the same direction as the forward direction of the oscillating weight 16). Meanwhile, when the oscillating weight 16 is rotated in the forward direction, the gear 26 is rotated in the reverse direction, and the second clutch mechanism 25 does not transmit this reverse rotation. In contrast, when the oscillating weight 16 is rotated in the reverse direction, the clutch mechanism 22 does not transmit this reverse rotation. However, into the second clutch mechanism 25, a rotation reverse to that in the case where the oscillating weight 16 is rotated in the forward direction is input. The second clutch mechanism 25 transmits this rotation 25 to the rotating electrode group. In addition, a direction of the rotation to be transmitted via the second clutch mechanism to the rotating electrode group is the same as the direction of the rotation to be transmitted via the clutch mechanism 22 when the oscillating weight 16 is rotated in the forward direction. With this, in both of the cases where the oscillating weight 16 is rotated in the forward direction and the oscillating weight 16 is rotated in the reverse direction, the motive power generated by those rotations is transmitted in the same direction to the rotating electrode group. In other words, in this embodiment, the motive power generated by the reverse rotation of the oscillating weight 16, which is not used in the first embodiment and other embodiments, is also used so as to rotate the rotating electrode group. With this, the rotating electrode group can be rotated efficiently and at high rotation speed.

Sixth Embodiment

Next, a sixth embodiment of the present invention is described. Also this embodiment has a configuration similar to that of the first embodiment except the configuration of the motive power transmission mechanism 17.

Figure 8:
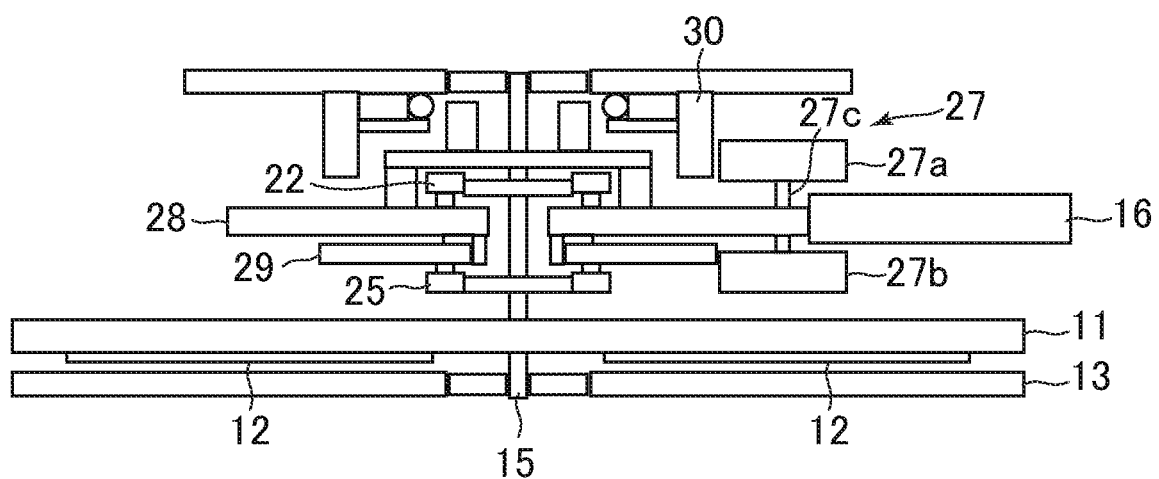
FIG. 8 is an explanatory view for illustrating a motive power transmission mechanism of an electric power generating device according to a sixth embodiment of the present invention.

FIG. 8 is an explanatory view for illustrating a configuration of the motive power transmission mechanism 17 according to this embodiment. In this embodiment, the function of the two-way clutch mechanism similar to that in the fifth embodiment is exerted by a planetary gear. Specifically, the motive power transmission mechanism 17 according to this embodiment includes not only the clutch mechanism 22 and the second clutch mechanism 25, but also a planetary gear 27, a first planetary carrier 28, a second planetary carrier 29, and a fixed gear 30. Further, the oscillating weight 16 is mounted not to the rotary shaft 21 but to the first planetary carrier 28. The planetary gear 27 includes an upper gear 27*a*, a lower gear 27*b*, and a coupling shaft 27*c* configured to couple those gears to each other and pass through the first planetary carrier 28. The planetary gear 27 is configured to be revolved in conjunction with rotations of the first planetary carrier 28. Further, the upper gear 27*a* and the lower gear 27*b* are configured to turn on their axes in conjunction with each other. The upper gear 27*a* is meshed with the fixed gear 30, and the lower gear 27*b* is meshed with the second planetary carrier 29.

When the oscillating weight 16 is rotated in the forward direction, in conjunction therewith, the first planetary carrier 28 is rotated in the forward direction. This rotation is transmitted to the rotary shaft 15 via the clutch mechanism 22. With this, the rotating electrode group is also rotated in the forward direction. At this time, the planetary gear 27 is revolved together with the first planetary carrier 28 in the forward direction, and the upper gear 27*a* and the fixed gear 30 meshed with each other cause the planetary gear 27 to turn on its axis in the forward direction. This axial turning of the planetary gear 27 in the forward direction is transmitted to the second planetary carrier 29 via the lower gear 27*b*. With this, the second planetary carrier 29 is rotated in the reverse direction. However, the second clutch mechanism 25 does not transmit this reverse rotation of the second planetary carrier 29.

Meanwhile, when the oscillating weight 16 is rotated in the reverse direction, in conjunction therewith, the first planetary carrier 28 is rotated in the reverse direction. However, the clutch mechanism 22 does not transmit this reverse rotation. At this time, the planetary gear 27 is revolved in the reverse direction and turns on its axis in the reverse direction. In conjunction with this axial turning in the reverse direction, the second planetary carrier 29 is rotated in the forward direction. The second clutch mechanism 25 transmits this forward rotation to the rotary shaft 15. With this, the rotating electrode group is rotated in the forward direction.

In this way, according to the motive power transmission mechanism 17 of this embodiment, as in the fifth embodiment, in both of the cases where the oscillating weight 16 is rotated in the forward direction and the oscillating weight 16 is rotated in the reverse direction, the motive power generated by those rotations is transmitted to the rotating electrode group such that the rotating electrode group is rotated in the forward direction. With this, the rotating electrode group can be rotated efficiently and at higher rotation speed than that of the oscillating weight 16.

Seventh Embodiment

Next, a seventh embodiment of the present invention is described. An electric power generating device and a portable electric apparatus according to this embodiment are different in configuration of the clutch mechanism 22 from those of the first embodiment. Other configurations are the same as those of the first embodiment illustrated in FIG. 1 and FIG. 2.

Figure 14:
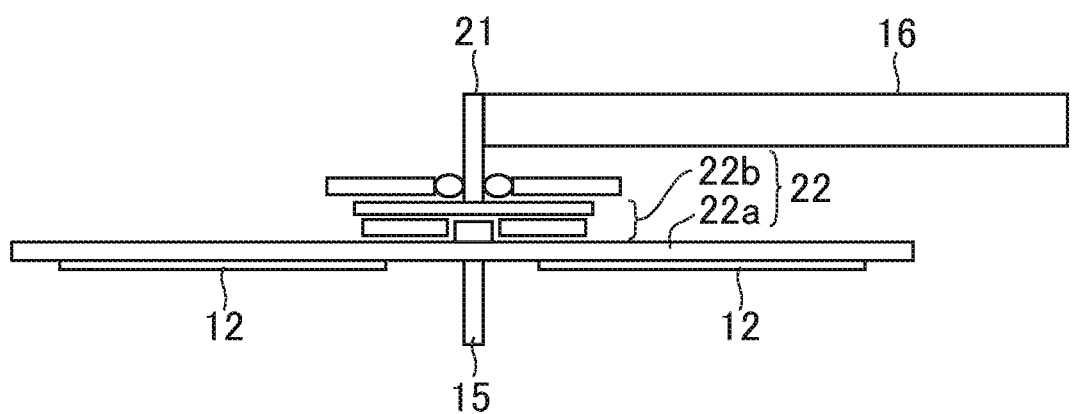
FIG. 14 is an explanatory view for illustrating a motive power transmission mechanism of an electric power generating device according to a seventh embodiment of the present invention.

FIG. 14 is an explanatory view for illustrating a configuration of the motive power transmission mechanism according to the seventh embodiment. As illustrated in FIG. 14, the motive power transmission mechanism according to the seventh embodiment does not include the first substrate 11 (refer to FIG. 3) described in the first embodiment. Thus, a lowermost surface of the clutch mechanism 22 directly faces the counter electrodes 14 (not shown in FIG. 14) without interposition of other members. As illustrated in FIG. 14, in the clutch mechanism 22, a part having the lowermost surface that faces the counter electrodes 14 is referred to as a clutch lower portion 22*a*, and a part other than the clutch lower portion 22*a* is referred to as a clutch upper portion 22*b*. In the seventh embodiment, on the lowermost surface of the clutch lower portion 22*a*, the electret electrodes 12 are arranged in a circular shape at intervals.

In conjunction with the rotation of the oscillating weight 16, the clutch lower portion 22*a* of the clutch mechanism 22 is rotated about the rotary shaft 15. With this rotation of the clutch lower portion 22*a*, as in the first embodiment, the electret electrodes 12 are moved relative to the counter electrodes 14 in a manner that the overlapping areas therebetween are varied. With this, the electrical charging and discharging of the counter electrodes 14 are performed. A diameter of the clutch lower portion 22*a* is set larger than a diameter of the clutch upper portion 22*b*. With this setting, the electret electrodes 12 formed on the lowermost surface of the clutch lower portion 22a adequately face and overlap with the counter electrodes 14.

As described above, in the configuration employed in the seventh embodiment, the clutch mechanism 22 doubles as the first substrate 11 described in the first embodiment. With this, a thickness of the electric power generating device in a direction of the rotary shaft 15 can be reduced. As a result, the electric power generating device and the portable electric apparatus that uses the electric power generating device can be downsized.

[Modification of Oscillating Weight]

Next, a modification of the oscillating weight 16 is described. In the above description, in each of the embodiments, the oscillating weight 16 is formed of a single rigid member. However, the oscillating weight 16 may be formed of a plurality of members, and a position of the center of gravity of an entirety of the oscillating weight 16 may be varied in accordance with the rotation speed of the oscillating weight 16.

Figure 9A:
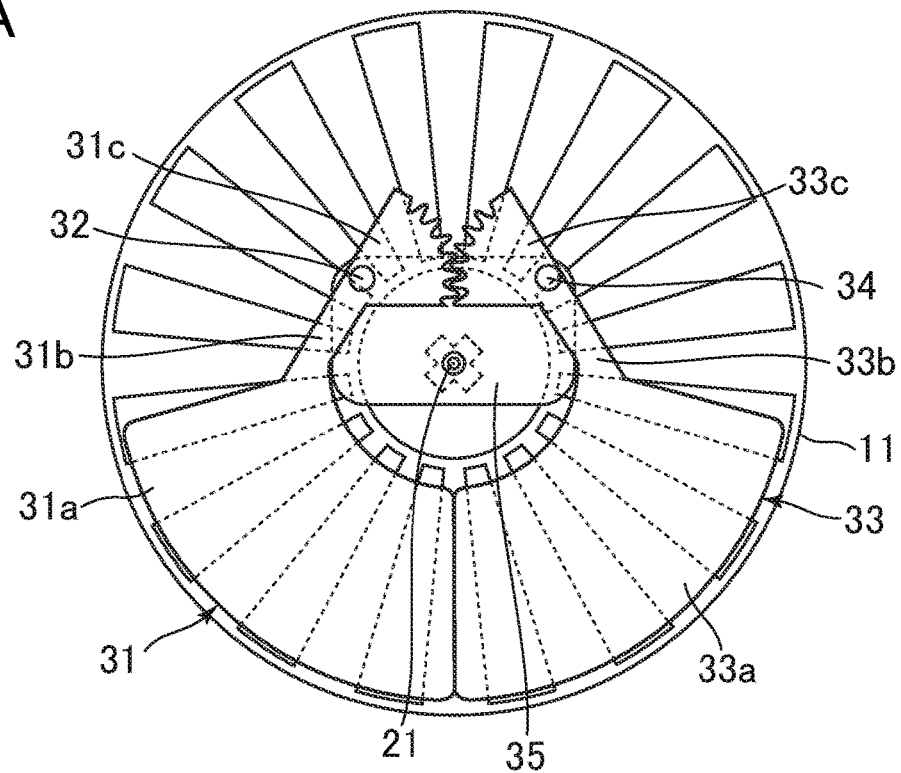
FIG. 9A is a plan view for illustrating a modification of an oscillating weight.
Figure 9B:
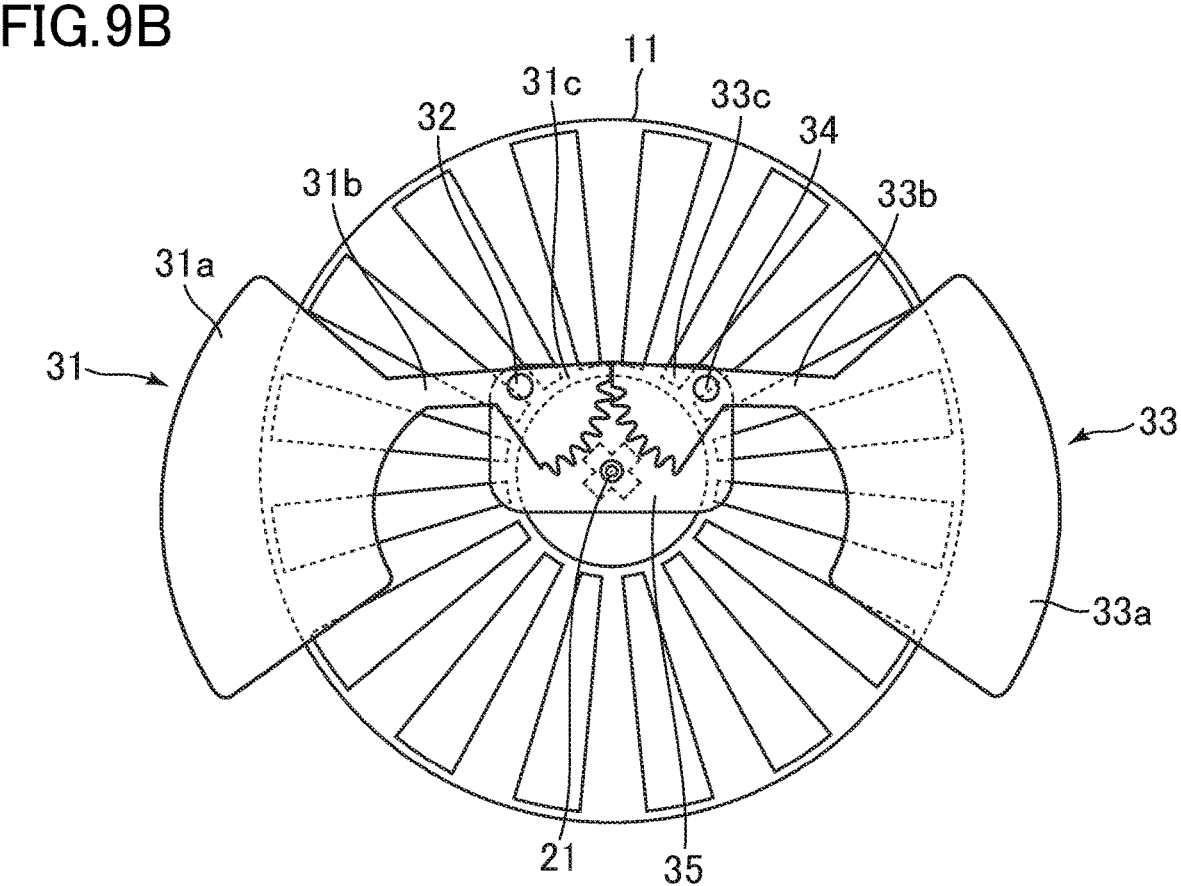
FIG. 9B is a plan view for illustrating a modification of the oscillating weight.
Figure 10:
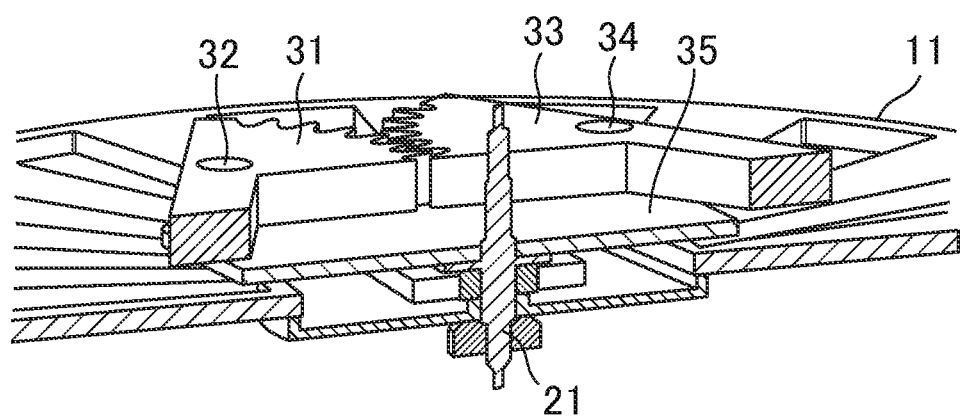
FIG. 10 is a partial sectional perspective view for illustrating the modification of the oscillating weight.

FIG. 9A and FIG. 9B are each a view for illustrating a configuration of the oscillating weight 16 according to this modification, specifically, a plan view for illustrating the electric power generating device 10 as viewed from above. Further, FIG. 10 is a partial sectional perspective view for illustrating a cross-section taken along the rotation center of the oscillating weight 16. As illustrated in FIG. 9A, FIG. 9B, and FIG. 10, the oscillating weight 16 includes a first weight element 31, a first rotary shaft 32, a second weight element 33, a second rotary shaft 34, and a base 35.

The first weight element 31 includes a center-of-gravity portion 31a, an arm portion 31b, and an engagement portion 31c. The center-of-gravity portion 31a is a main part including a center of gravity of the first weight element 31 and having a weight that is substantially equal to an overall weight of the first weight element 31. The center-of-gravity portion 31a has substantially a fan shape. The engagement portion 31c has substantially a fan shape including an arc part having a tooth profile. The center-of-gravity portion 31a and the engagement portion 31c are coupled to each other through intermediation of the arm portion 31b. Near a boundary between the arm portion 31b and the engagement portion 31c, the first rotary shaft 32 is fixed. The first weight element 31 is rotated about the first rotary shaft 32 with respect to the base 35. The second weight element 33 is formed into the same shape as that of the first weight element 31, and includes a center-of-gravity portion 33a, an arm portion 33b, and an engagement portion 33c. The second weight element 33 is rotated about the second rotary shaft 34 with respect to the base 35. Further, the engagement portion 31c of the first weight element 31 and the engagement portion 33c of the second weight element 33 are arranged such that their teeth are meshed with each other. With this, the first weight element 31 and the second weight element 33 are interlocked with each other and rotated reverse to each other.

Both the first rotary shaft 32 and the second rotary shaft 34 are supported in a rotatable manner by the base 35. Further, the base 35 is fixed to the rotary shaft 21 of the motive power transmission mechanism 17, and is rotated about the rotary shaft 21. The rotation of the base 35 is transmitted to the rotating electrode group via the motive power transmission mechanism 17.

When the electric power generating device 10 is perpendicular to a horizontal plane, both the center-of-gravity portion 31a and the center-of-gravity portion 33a are displaced by gravity in a vertical direction. As a result, as illustrated in FIG. 9A, the center-of-gravity portion 31a and the center-of-gravity portion 33a are held in contact with each other. In this state, when the oscillating weight 16 starts to be rotated, the first weight element 31 and the second weight element 33 are integrally rotated about the rotary shaft 21. Specifically, while the rotation speed of the oscillating weight 16 is low, the center of gravity of the rotating weight 16 is eccentrically located away from the rotation center (position of the rotary shaft 21), and the oscillating weight 16 functions as in the case of being formed of the single rigid member.

Meanwhile, when the rotation speed of the entirety of the oscillating weight 16 is increased, by a centrifugal force, the center-of-gravity portion 31a and the center-of-gravity portion 33a are separated from each other. The first weight element 31 is rotated clockwise about the first rotary shaft 32, and the second weight element 33 is rotated counterclockwise about the second rotary shaft 34. At this time, the engagement portion 31c and the engagement portion 33c are engaged with each other, and hence the first weight element 31 and the second weight element 33 are interlocked and rotated in symmetry with each other. With this, as the rotation speed of the entirety of the oscillating weight 16 is increased, a distance between the center-of-gravity portion 31a and the center-of-gravity portion 33a is increased, and the position of the center of gravity of the entirety of the oscillating weight 16 comes closer to the rotation center (position of the rotary shaft 21). When the rotation speed of the oscillating weight 16 finally reaches a certain rotation speed, the center-of-gravity portion 31a and the center-of-gravity portion 33a are moved to positions reverse to each other, that is, enter the state illustrated in FIG. 9B. In this state, the center of gravity of the entirety of the oscillating weight 16 is closest to the rotation center. In such a state, the oscillating weight 16 functions as a flywheel, and can easily maintain the rotation. In order to prevent the first weight element 31 and the second weight element 33 that have been moved to positions reverse to each other as illustrated in FIG. 9B from being further rotated, there may be arranged a stopper.

In this way, the oscillating weight 16 according to this modification includes the two weight elements that are interlocked with each other and rotated reverse to each other. With this, a distance between the rotation center and the center of gravity of the oscillating weight 16 is varied in accordance with variation in rotation speed of the oscillating weight 16 itself. Thus, the following two functions can be exerted. Specifically, under a state in which the rotation of the oscillating weight 16 is slow, the rotation in conjunction with the movement of the portable electric apparatus 1 is facilitated. After the rotation speed is increased, rotations at this high speed are easily maintained. In particular, in this embodiment, electric power is generated by varying the overlapping areas between the electret electrodes 12 and the counter electrodes 14. In a case where electric power is generated by such a method, also when the rotation speed is excessively high, effective charging and discharging cannot be adversely performed. As a result, efficiency in generation of electric power is deteriorated. In other words, a speed within a certain range is an ideal speed for efficient generation of electric power. In order that rotation at this ideal speed is easily maintained, weights and other factors of the weight elements of the oscillating weight 16 are adjusted. With this, the oscillating weight 16 easily maintains a rotation speed at which electric power can be efficiently generated.

[Operative Motive Power Transmission Mechanism]

In addition to the configuration described above, the electric power generating device 10 according to the embodiments of the present invention may have a function to generate electric power not only with the movement of the portable electric apparatus 1 itself, but through manual operations by a user of the portable electric apparatus 1. Such a function is exerted with an operating member 41 and an operative motive power transmission mechanism 42.

The operating member 41 is a member configured to receive the manual operations by the user. In this case, the operating member 41 is supported in a rotatable manner, and receives rotation operations by the user. For example, when the portable electric apparatus 1 is a wristwatch, the operating member 41 may be a crown.

The operative motive power transmission mechanism 42 is configured to transmit motive power generated by the operations received via the operating member 41 to the rotating electrode group. When the user performs the operation of manually rotating the operating member 41, the motive power transmitted via this mechanism causes the rotation of the rotating electrode group. With this, the electric power generating device 10 can generate electric power. This operative motive power transmission mechanism 42 may be variously configured. Now, two examples of the operative motive power transmission mechanism 42 are described.

Figure 11:
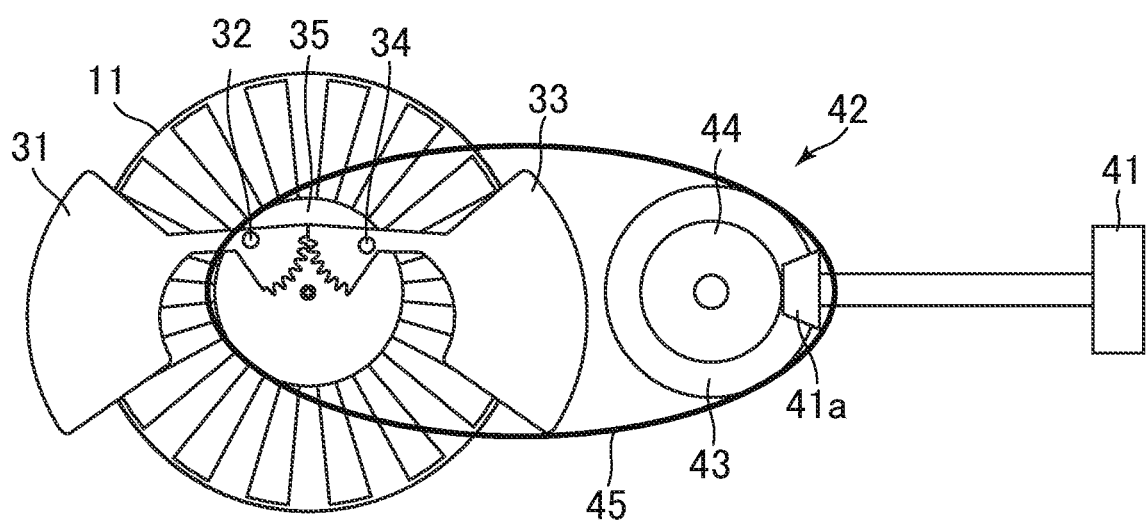
FIG. 11 is an explanatory view for illustrating a first example of an operative motive power transmission mechanism.

FIG. 11 is an explanatory view for illustrating a first example of the operative motive power transmission mechanism 42, specifically, illustrating a positional relationship between the members in the portable electric apparatus 1 as viewed from above. As illustrated in FIG. 11, a bevel gear 41a is arranged at a distal end of the operating member 41, and is meshed with a bevel gear 43 that is coaxially coupled to a one-way clutch 44. When the bevel gear 43 is rotated in one predetermined direction, this rotation is transmitted by the one-way clutch 44 to the base 35 via a belt 45. In this example, unlike the illustration in FIG. 9A and FIG. 9B, the base 35 is formed into a disc shape. With such a configuration, when the user rotates the operating member 41 in the one predetermined direction, this rotation is transmitted via the bevel gear 43, the one-way clutch 44, the belt 45, and the base 35 to the rotating electrode group. Further, when the user rotates the operating member 41 in the reverse direction, the one-way clutch 44 does not transmit this rotation. Thus, the rotating electrode group is not rotated.

Figure 12A:
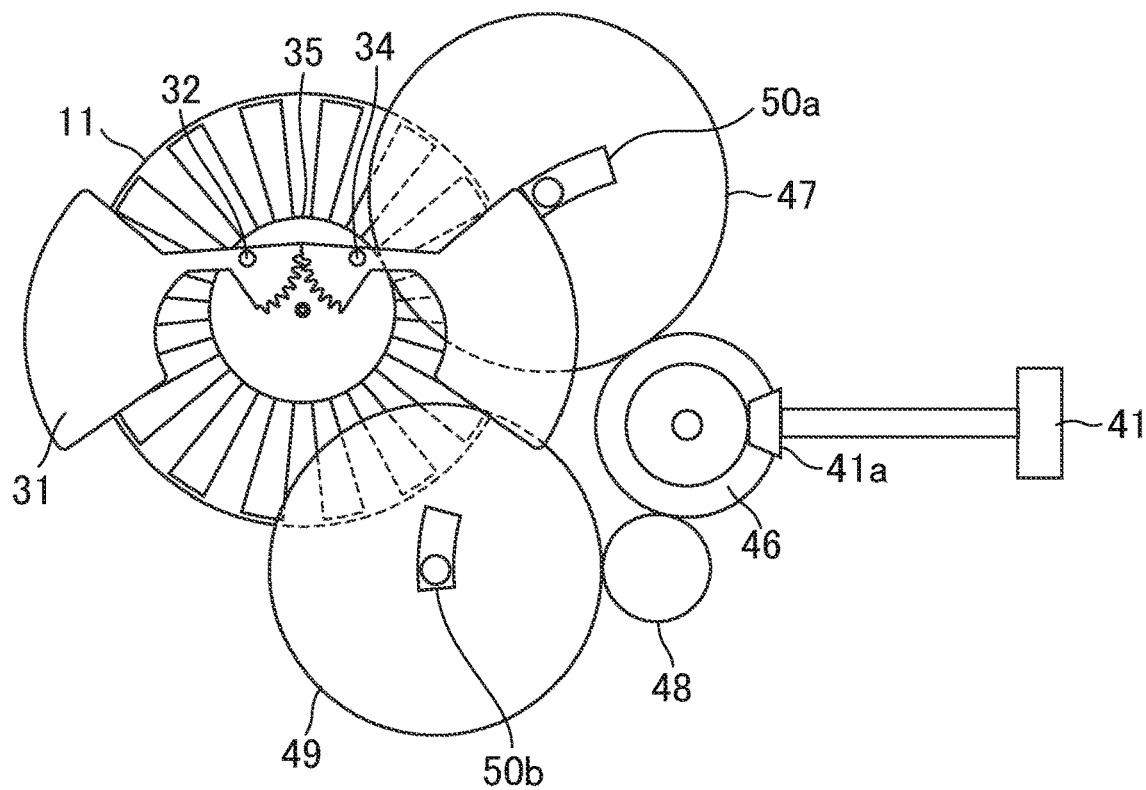
FIG. 12A is an explanatory view for illustrating a second example of the operative motive power transmission mechanism.
Figure 12B:
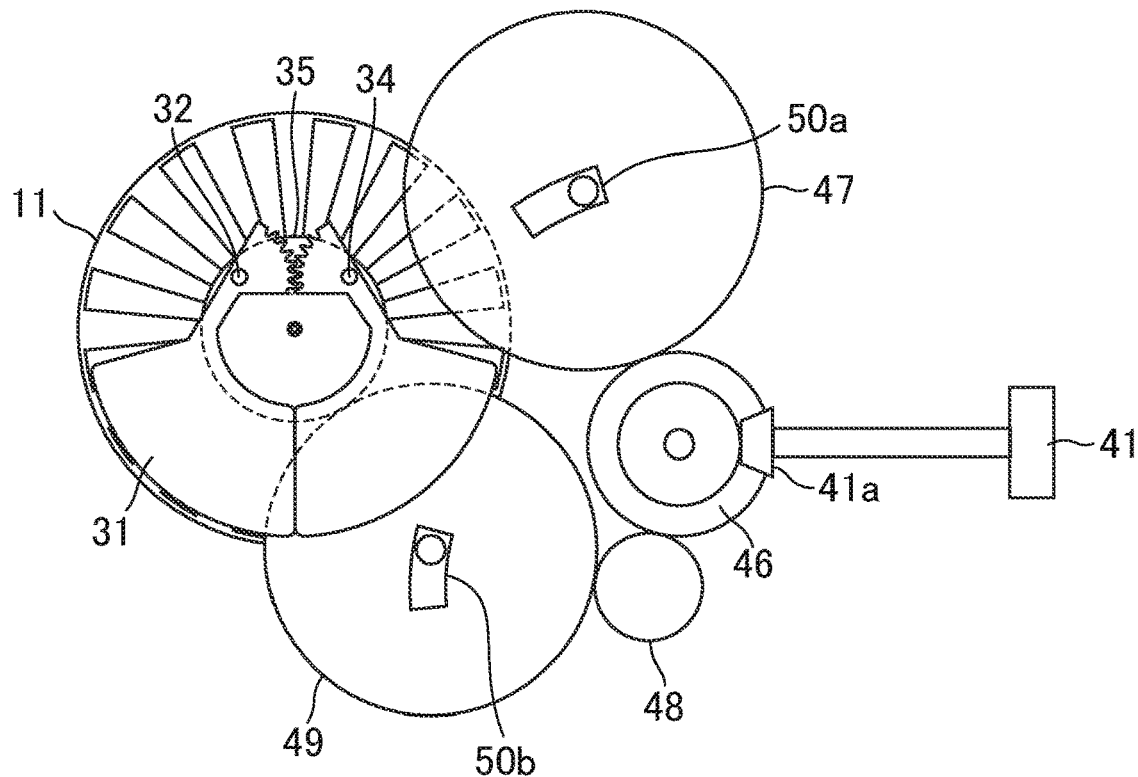
FIG. 12B is an explanatory view for illustrating the second example of the operative motive power transmission mechanism.

Next, with reference to FIG. 12A and FIG. 12B, a second example of the operative motive power transmission mechanism 42 is described. The operative motive power transmission mechanism 42 according to the second example includes a bevel gear 46, a first movable gear 47, a gear 48, and a second movable gear 49. The bevel gear 46 is arranged so as to mesh with the first movable gear 47 and the gear 48, and the second movable gear 49 is arranged so as to mesh with the gear 48. Further, rotary shafts of the first movable gear 47 and the second movable gear 49 are inserted respectively into arcuate guide grooves 50a and 50b. When rotational motive power is applied to the first movable gear 47 and the second movable gear 49, along the guide grooves 50a and 50b, positions of entireties of those gears are varied. FIG. 12A is an example for illustrating positions of the gears under a state in which the first movable gear 47 has received clockwise rotational motive power, and the second movable gear 49 has received counterclockwise rotational motive power. The first movable gear 47 is meshed with teeth formed around the base 35, whereas the second movable gear 49 is idled without being meshed with the base 35. FIG. 12B is an example for illustrating positions of the gears under a state in which the first movable gear 47 has received the counterclockwise rotational motive power, and the second movable gear 49 has received the clockwise rotational motive power. In contrast to FIG. 12A, the second movable gear 49 is meshed with the teeth formed around the base 35, whereas the first movable gear 47 is disengaged from the base 35.

When the operating member 41 receives a rotational operation in the one predetermined direction (in this case, counterclockwise direction as viewed from the right side of the drawing sheet), this rotation is transmitted to the bevel gear 46 via the bevel gear 41a at the distal end of the operating member 41. With this, the bevel gear 46 is rotated counterclockwise. In conjunction with this rotation, the first movable gear 47 and the gear 48 are rotated clockwise, and the second movable gear 49 is rotated counterclockwise. With this, those movable gears are moved to the positions illustrated in FIG. 12A, and motive power for rotating the rotating electrode group counterclockwise is transmitted to the base 35 via the first movable gear 47. In contrast, when the operating member 41 receives a rotational operation in the reverse direction (clockwise direction as viewed from the right side of the drawing sheet), the bevel gear 46 is rotated clockwise. In conjunction with this rotation, the first movable gear 47 and the gear 48 are rotated counterclockwise, and the second movable gear 49 is rotated clockwise. With this, those movable gears are moved to the positions illustrated in FIG. 12B, and the motive power for rotating the rotating electrode group counterclockwise is transmitted to the base 35 via the second movable gear 49. In this way, through use of the two movable gears, irrespective of the directions of the rotational operations received via the operating member 41, the rotating electrode group can be rotated.

According to the operative motive power transmission mechanism 42, for example, when the portable electric apparatus 1 is not used for a certain time period, and electric power stored in the capacitor member 3 is discharged, the user can manually generate electric power with the electric power generating device 10, and activate the portable electric apparatus 1.

The embodiments of the present invention are not limited to those described above. Specifically, in the above description, positions of the counter electrodes 14 are fixed, whereas the electret electrodes 12 are rotated, thereby varying the overlapping areas therebetween. In contrast, positions of the electret electrodes 12 may be fixed, and the plurality of counter electrodes 14 may serve as the rotating electrode group, and be rotated in conjunction with the movement of the oscillating weight 16.

Further, the configurations according to the embodiments described above, and the configuration according to the modification described above may be combined with each other. For example, the substrate weight 24 of the electric power generating device according to the third embodiment is applicable also to the motive power transmission mechanisms 17 according to the other embodiments. Still further, the modification of the oscillating weight 16, which is illustrated in FIG. 9A, FIG. 9B, and FIG. 10, is applicable also to any of the motive power transmission mechanisms 17 according to the first embodiment to the seventh embodiment described above. Similarly, the operative motive power transmission mechanism 42 described above may be combined with any of the motive power transmission mechanisms 17 according to the first embodiment to the seventh embodiment described above.

The invention claimed is:

1. An electric power generating device, comprising:
   a plurality of electret electrodes each made of an electret material and formed into a planar shape, and arranged in a circular shape at intervals in a first plane;
   a plurality of counter electrodes arranged in a circular shape in a second plane facing the first plane so as to face the plurality of electret electrodes;
   an oscillating weight supported in a rotatable manner; and
   a motive power transmission mechanism configured to transmit motive power generated by rotations of the oscillating weight to a rotating first electrode group comprising any one of the plurality of electret electrodes and the plurality of counter electrodes, to thereby rotate the rotating electrode group so that the rotating electrode group is moved relative to a second electrode group from among the plurality of electret electrodes and the plurality of the counter electrodes,
   the motive power transmission mechanism comprising a first clutch mechanism configured to transmit only a rotation of the oscillating weight in one predetermined direction,
   the oscillating weight comprising a first weight element rotatably supported and a second weight element rotatably supported,
   as the rotation speed of the oscillating weight is increased and the first weight element and the second weight element are rotated in symmetry with each other, a distance from a rotation center of the oscillating weight to a center of gravity is increased.

2. The electric power generating device according to claim 1, wherein the motive power transmission mechanism further comprises a speed-increasing mechanism configured to transmit the rotation of the oscillating weight at an increased speed.

3. The electric power generating device according to claim 1,
   wherein the rotating electrode group is fixed to a single substrate,
   wherein the motive power transmission mechanism is configured to rotate the single substrate so that the rotating electrode group is rotated, and
   wherein the electric power generating device further comprises a substrate weight mounted on an outer peripheral side of the single substrate.

4. The electric power generating device according to claim 1, wherein the motive power transmission mechanism further comprises a second clutch mechanism configured to transmit, to the rotating electrode group, only a rotation of the oscillating weight in a direction opposite to the one predetermined direction.

5. A portable electric apparatus, comprising:
   the electric power generating device of claim 1; and
   a load configured to be operated by consuming electric power generated by the electric power generating device,
   the oscillating weight being configured to be rotationally moved in conjunction with movement of the portable electric apparatus itself, and
   a step-down circuit configured to be driven by the electric power generated by the electric power generating device, and to step down a voltage caused by the generated electric power to output the voltage.

6. The electric power generating device according to claim 1, wherein
   the first weight element comprising a first engagement portion,
   the second weight element comprising a second engagement portion which meshes with the first engagement portion,
   the first weight element and the second weight element are interlocked and rotated in symmetry with each other by the first engagement portion and the second engagement portion, which are meshed with each other.

7. An electric power generating device, comprising:
   a plurality of electret electrodes each made of an electret material and formed into a planar shape, and arranged in a circular shape at intervals in a first plane;
   a plurality of counter electrodes arranged in a circular shape in a second plane facing the first plane so as to face the plurality of electret electrodes;
   an oscillating weight supported in a rotatable manner; and
   a motive power transmission mechanism configured to transmit motive power generated by rotations of the oscillating weight to a rotating first electrode group comprising any one of the plurality of electret electrodes and the plurality of counter electrodes, to thereby rotate the rotating electrode group so that the rotating electrode group is moved relative to a second electrode group from among the plurality of electret electrodes and the plurality of the counter electrode,
   the motive power transmission mechanism comprising a first clutch mechanism configured to transmit only a rotation of the oscillating weight in one predetermined direction,
   the first clutch mechanism comprising a rotating substrate,
   the electret electrodes are formed on the rotating substrate.

8. A portable electric power generating device, comprising:
   a plurality of electret electrodes each made of an electret material and formed into a planar shape, and arranged in a circular shape at intervals in a first plane;
   a plurality of counter electrodes arranged in a circular shape in a second plane facing the first plane so as to face the plurality of electret electrodes;
   an oscillating weight supported in a rotatable manner; and
   a motive power transmission mechanism configured to transmit motive power generated by rotations of the oscillating weight to a rotating first electrode group comprising any one of the plurality of electret electrodes and the plurality of counter electrodes, to thereby rotate the rotating electrode group so that the rotating electrode group is moved relative to a second electrode group from among the plurality of electret electrodes and the plurality of the counter electrode,
   the motive power transmission mechanism comprising a first clutch mechanism configured to transmit only a rotation of the oscillating weight in one predetermined direction,
   a load configured to be operated by consuming electric power generated by the electric power generating device,
   the oscillating weight being configured to be rotationally moved in conjunction with movement of the portable electric power generating device itself,
   an operating member configured to receive a manual rotation operation by a user,
   an operative motive power transmission mechanism configured to transmit, to the rotating electrode group, motive power generated by the manual rotation operation received via the operating member, the operative motive power transmission mechanism comprising a first gear and a second gear, the first gear configured to transmit, to the rotating electrode group, motive power generated by the manual rotation operation in a first direction received via the operating member, the second gear configured to transmit, to the rotating electrode group, motive power generated by the manual rotation operation in a second direction opposite to the first direction received via the operating member.

9. The electric power generating device according to claim 8, wherein the first gear is idled by the rotation operation in the second direction received by the operation member, and the second gear is idled by the rotation operation in the first direction received by the operation member.

\* \* \* \* \*